United States Patent [19]

Sikkema et al.

[11] Patent Number: 5,674,969

[45] Date of Patent: Oct. 7, 1997

[54] RIGID ROD POLYMER BASED ON PYRIDOBISIMIDAZOLE

[75] Inventors: Doetze Jakob Sikkema, AT Oosterbeek, Netherlands; Vadim Leonidovich Lishinsky, Parkersburg, Russian Federation

[73] Assignee: Akzo Nobel NV, Arnhem, Netherlands

[21] Appl. No.: 535,225

[22] PCT Filed: Apr. 22, 1994

[86] PCT No.: PCT/EP94/01302

§ 371 Date: Oct. 27, 1995

§ 102(e) Date: Oct. 27, 1995

[87] PCT Pub. No.: WO94/25506

PCT Pub. Date: Nov. 10, 1994

[30] Foreign Application Priority Data

Apr. 28, 1993 [NL] Netherlands ............... 9300722

[51] Int. Cl.$^6$ ..................... C08G 73/18; C08G 73/22
[52] U.S. Cl. ............ 528/183; 528/186; 528/193; 528/337; 528/342; 528/423; 528/503; 264/51
[58] Field of Search ................. 528/183, 186, 528/193, 337, 342, 423, 503; 264/51

[56] References Cited

U.S. PATENT DOCUMENTS

| | | | |
|---|---|---|---|
| 4,002,679 | 1/1977 | Arnold | 260/556 |
| 4,079,039 | 3/1978 | Gerber | 260/47 |
| 4,533,692 | 8/1985 | Wolfe et al. | 524/417 |
| 5,039,778 | 8/1991 | Dang et al. | 528/183 |
| 5,041,522 | 8/1991 | Dang et al. | 528/183 |
| 5,136,012 | 8/1992 | Dang et al. | 528/183 |

FOREIGN PATENT DOCUMENTS 1108023  1/1965  United Kingdom .

OTHER PUBLICATIONS

Lyotropic Main Chain Liquid Crystal Polymers; Advances in Polymer Science 98; M.G. Northolt and D.J. Sikkema, pp. 115–177.

Encyclopedia of Polymer Science and Engineering, vol. 11, Peroxy Compounds to Polyesters; John Wiley & Sons, 1985, pp. 601–635.

Journal of Polymer Science, 1973 by John Wiley & Sons, Inc., pp. 1703–1719.

X–Ray Defraction Methods in Polymer Science, Leroy E. Alexander, pp. 198–259.

The Plastics and Rubber Institute Seventh Int'l. Conf. on Deformation, Yield and Fracture of Polymers at Cambridge (UK 1988), pp. 11/1–11/4.

British Corrosion Journal; F.N. Smith and H. Van Droffelaar; 1991; vol. 26; No. 4; pp. 265–267.

Primary Examiner—James J. Seidleck
Assistant Examiner—Duc Truong
Attorney, Agent, or Firm—Joseph M. Noto; Louis A. Morris

[57] ABSTRACT

A rigid rod polymer in which at least 50% of the recurring groups correspond to the formula;

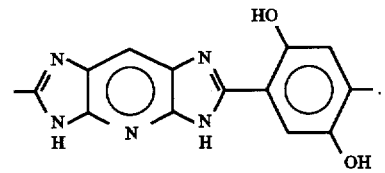

Included in the invention are processes for preparation of the above rigid rod polymer and using such polymer as well as compositions employing the above rigid rod polymer.

19 Claims, No Drawings

RIGID ROD POLYMER BASED ON PYRIDOBISIMIDAZOLE

This application is a 371 of PCT/EP94/01302 filed Apr. 22, 1994.

The invention pertains to a rigid rod polymer based on pyridobisimidazole, to a process for the manufacture thereof, to a polymer composition into which such a polymer is incorporated, and to a process for fabricating films, filaments, and yarns therefrom.

Rigid semi-ladder polymers based on pyridobisimidazole have been described, int. al., in U.S. Pat. No. 4,533,692. In claim 100 of said patent publication the homopolymer of tetraaminopyridine and terephthalic acid is claimed. However, it has been found that it is not possible technologically to prepare a polymer based on the latter monomers having an $\eta_{rel}$ of more than 1.3, or not possible without anything more.

The invention now provides a rigid rod polymer of the known type mentioned in the opening paragraph which can be polymerised to a high degree of polymerisation without any problem and extruded from the polymerisation solution in polyphosphoric acid or spun to form films, filaments, and yarns of exceptionally favourable physical properties. The rigid rod polymer according to the invention is composed of a polymer in which at least 50% of the recurring groups corresponds to the formula:

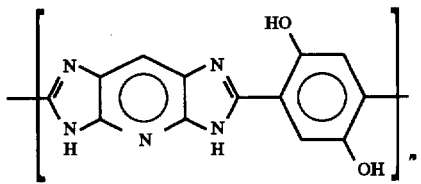

It should be noted that polymers based on 2,5-dihydroxy-p-phenylene were earlier proposed in U.S. Pat. No. 5,041,522. However, none of the polymers described therein was derived from the heterocyclic monomer tetraaminopyridine. Also in view of the poor results obtained when preparing a polymer based on tetraaminopyridine and terephthalic acid, it should be considered extremely surprising that it is not only possible to obtain a polymer of high molecular weight from tetraminopyridine and 2,5-dihydroxyterephthalic acid, but also that, to all appearances, it is possible to spin fibres therefrom which have interesting properties and differ favourably from fibres made of the structurally related poly-[benzo[1,2-d:4,5-d']bisthiazole-2,6-diyl-(2,5-dihydroxy-p-phenylene)] obtained from 2,5-dimercapto-p-phenylene diamine and 2,5-dihydroxyterephthalic acid, the preparation of which is disclosed in U.S. Pat. No. 5,041,522.

At least 50% of the rigid rod polymers according to the present invention is composed of recurring groups of pyridobisimidazole-2,6- diyl(2,5-dihydroxy-p-phenylene), while in the remaining groups the 2,5-dihydroxy-p-phenylene is replaced by an arylene which may be substituted or not and/or the pyridobisimidazole is replaced by benzobisimidazole, benzobisthiazole, benzobisoxazole, pyridobisthiazole, and/or pyridobisoxazole. Preference is given in that case to ladder polymers at least 75% of the recurring groups of which is made up of pyridobisimidazole-2,6-diyl(2,5-dihydroxy-p-phenylene), while in the remaining groups the 2,5-dihydroxy-p-phenylene is replaced by an arylene which may be substituted or not and/or the pyridobisimidazole is replaced by benzobisimidazole, benzobisthiazole, benzobisoxazole, pyridobisthiazole, and/or pyridobisoxazole.

In the case of partial replacement (up to 50% at most) of the 2,5-dihydroxy-p-phenylene, preference is given to a compound which is left after removal of the carboxyl groups of an arylene dicarboxylic acid such as isophthalic acid, terephthalic acid, 2,5-pyridine dicarboxylic acid, 2,6-naphthalene dicarboxylic acid, 4,4'-diphenyl dicarboxylic acid, 2,6-quinoline dicarboxylic acid, and 2,6-bis(4-carboxyphenyl)pyridobisimidazole.

In this document, the relative viscosity $\eta_{rel}$ is measured on a solution with a concentration of 0.25 g/dl in methane sulphonic acid at 25° C., unless indicated otherwise.

If the making of one- or two-dimensional objects, such as fibres, films, tapes, and the like, is desired, the polymer of the present invention should have a relative viscosity $\eta_{rel}$ of at least 3.5. Preferably, the relative viscosity $\eta_{rel}$ is at least 5, more particularly, equal to or higher than about 10. So far, optimum results have been attained using the homopolymer poly[pyridobisimidazole-2,6-diyl(2,5-dihydroxy-p-phenylene)] having an $\eta_{rel} > 10$. When spinning fibres from the homopolymer, very good results are obtained if $\eta_{rel}$ is higher than about 12. Relative viscosities of over 50 can be achieved without any special measures having to be taken.

It was found that the lower the amounts of 2,5-dihydroxy-p-phenylene and pyridobisimidazole replaced, the higher the obtainable viscosity and the better the characteristics of the products obtainable from the polymers will be.

Hence, rigid rod polymer composed of a polymer in which at least 90% of the recurring groups corresponds to the formula:

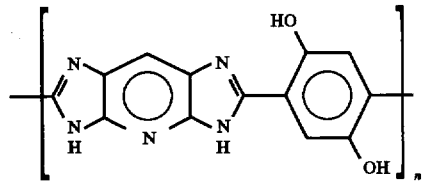

are preferred, with 100% rigid rod polymers made of these groups being the most preferred embodiment.

The rod polymers according to the invention can be prepared in a simplified manner as compared with the descriptions in the aforementioned U.S. patent specifications, U.S. Pat. No. 4,533,692 and U.S. Pat. No. 5,041,522. The preparation of the homopolymer can be carried out by the incorporation, with vigorous stirring, of an equimolar mixture of 2,5-dihydroxyterephthalic acid and the trihydrochloride-monohydrate of tetraaminopyridine into strong polyphosphoric acid. Strong polyphosphoric acid can be obtained, for example, by mixing commercially available polyphosphoric acid and $P_2O_5$, or mixing phosphoric acid with $P_2O_5$. After evacuating several times and letting in nitrogen, the temperature of the mixture is slowly heated to 100°–110° C., after which there is slow evacuation for 15 to 75 minutes to a pressure of less than 50 mbar, with care being taken to prevent objectionable foaming during the evaporation of hydrochloric acid. Finally, there is stirring at this reduced pressure at 100° C. for $\leq 1.5$ hours, after which, over one hour, the temperature is slowly raised to 135° C. until a virtually clear reaction mixture is obtained. Next, heating is continued until, after about one or two hours, the polymerisation temperature has risen to above 180° C. If the relative viscosity of the mixture is lower than the desired viscosity of $\geq 3.5$, preferably $>5$ (measured on 0.25 g in 100 ml of methane sulphonic acid at 25° C.), heating is continued until the desired viscosity is achieved. The polymer is then precipitated in water using a spinning arrangement, washed with ammonia, and dried in vacuo.

The use of the phosphate salt of tetraaminopyridine as the starting monomer for the polymerization reaction rather than the hydrochloride salt is very desirable, since HCl need not be removed, with attendant foaming risks, during the early stages of polymerisation. The phosphate salt can be prepared in situ or, e.g., by converting the hydrochloride to phosphate in a separate step.

If a high $\eta_{rel}$ is desired, the heating rate during the polymerisation reaction is accelerated. Furthermore, it was found that increasing the final temperature of the polymerisation reaction up to 220° C. will give the resulting solution improved spinning characteristics in the case tetraaminopyridine was used in the form of its hydrochloride or its phosphate salts. In a further improved embodiment, tetraaminopyridinium dihydroxyterephthalate is used as the starting product instead of the trihydrochloride monohydrate of tetraaminopyridine. This salt of tetraaminopyridine and 2,5-dihydroxyterephthalic acid can be prepared by adding an aqueous solution of the trihydrochloride monohydrate of tetraaminopyridine to an alkaline solution of 2,5-dihydroxyterephthalic acid with vigorous stirring, said stirring, if so desired, taking place without any oxygen being present, followed preferably by cooling, e.g., to between 0° and 18° C., washing with a suitable degassed medium such as degassed water, and, finally, flushing with nitrogen and drying. The salt so prepared has very good stability. Furthermore, a very high $\eta_{rel}$ is obtainable, with $\eta_{rel}$ of up to 80 being found. Thus using this starting product provides a readily utilisable preparative process for the polymer in which the following steps are performed:

a preparing a slurry from the tetraaminopyridinium dihydroxy terephthalate and strong polyphosphoric acid;

b homogenising the slurry so obtained at about 100° C. for a period of about 1 hour;

c continued stirring of the mixture at about 140° C. for about 1 hour;

d rapidly increasing the temperature to 180° C. to dissolve the remaining 2,5-dihydroxyterephthalic acid while polymerising at about 180° C. for >0.3 hours to 2.5 hours, preferably for 1 to 2.5 hours.

The polymer can be prepared in concentrations in the range of 10 to 21 wt. %. If a high molecular weight is desired, the concentration of the polymer in the polyphosphoric acid solution is preferably somewhat lower, such as about 14–18 wt. %. For the making of yarns, the concentration is desired to be in the range of 12–19 wt. %.

The mixture obtained from the polymerisation reaction can be used directly for spinning or extrusion into fibres, films or tapes without any further measures or additions to the mixture being required. Hence, in a preferred embodiment, the polymer is prepared and spun or extruded in one continuous process, which is a significant advantage over other polymers used for the spinning of very strong fibres such as poly(p-phenylene terephthalamide). To obtain a solution which can be spun or extruded directly, it is desired that the concentration of $P_2O_5$ in the $P_2O_5/H_2O$ solvent system is at least 79.5 wt. % and preferably not more than 84 wt. % after the reaction has ended. At a concentration of more than 84 wt. % of $P_2O_5$ it may be necessary under some circumstances to have a chain terminator such as benzoic acid present during the polymerisation reaction in order to prevent the viscosity from rising too high.

The invention further relates to a polymer composition which because of its viscosity is suitable for being extruded into one- or two dimensional objects, such as films, filaments, or yarns, the composition comprising a solution of a ladder polymer according to the invention in a solution of polyphosphoric acid, with the concentration of $P_2O_5$ in the $P_2O_5/H_2O$ solvent system after the reaction has ended being at least 79.5 wt. % and preferably not more than 84 wt. %.

The composition obtained can be spun into fibres with the aid of wet spinning equipment. Due to the use of highly concentrated polyphosphoric acid at the high spinning temperatures, it is greatly preferred to have at least parts of the spinning equipment made of a corrosion resistant material. Suitable materials are described in, e.g. *Brittish Corrosion Journal*, 1991, Vol. 26, No. 4, pp. 265–267.

The composition obtained from the polymerization reaction can be fed directly from the reactor to the spinning equipment. The technology applied in spinning poly(p-phenylene terephtalamide) is also suitable for the spinning of the polymer solution of the present invention. E.g., a single screw extruder and/or a booster pump can be employed, after which the material is extruded through a filter and a spinneret via an air gap into a coagulation bath. Preferably, fibres are spun at increased temperature, preferably between 100° and 300° C., and particularly at a temperature between 150° and 250° C. The spinneret may be provided with a conventional number of spinning holes, e.g., from about 10 up to 1000, with the size of the spinning holes being in the range of 50 to 250 µm. The air gap preferably has a length between 5 and 500 mm. As a very suitable coagulation medium, water or dilute aqueous phosphoric acid may be used. After coagulation, the fibres can be washed, preferably with water, and/or neutralised prior to or after washing or in between two washing steps. If so desired, an aftertreatment such as a heat treatment keeping the fibres under tension, can be applied to further align the molecular chains in the fibres, and so further increase the desired mechanical properties.

Also, films or tapes can be made directly from the composition which is obtained from the solution resulting from the polymerization reaction. These objects, which all are very small in at least one direction such as fibres, tapes or films can be applied either as such and, hence, consist of the polymer of the present invention, or they can be used in combination with similar objects made of other material. In the latter case, products can be made which comprise the objects of the present invention in combination with other materials. Advantageously, the products may be applied as reinforcement material in products which are used at high temperatures, or where the temperature can increase. Furthermore, the fibres may be cut and used as staple fibre or, when fibrillated, as pulp.

The thermal stability of the polymer of the present invention was found to be very good, with very low loss of the mechanical characteristics of the fibres made thereof being shown when testing at a temperature of 500° C.

To demonstrate that the products of the present invention have mechanical properties unique to an organic polymer fibre, fibres of the material of the present invention were tested using an internal shear modulus test. This test provides a good indication of several different characterics, e.g., the tensile and the torsional modulus.

The as-spun yarns—not having received an aftertreatment—prepared from the polymer according to the present invention were found to have an internal shear modulus equal to or higher than 2.0 GPa, and even higher than 3.0 GPa. It was found that by a treatment of the yarns, using heat under tension, a further significant improvement of the mechanical properties can be obtained. A very suitable manner was found in the treatment of as-spun yarns in an oven or other heating means at a temperature higher than 100° C. The treatment under tension at a temperature equal to or higher than 200° C., or equal to or higher than about 250° C., was found to be preferred. The mechanical properties of the yarns of the invention hardly decrease at temperatures up to 600° C. or even higher temperatures.

The heat treated yarns of the invention will show a good internal shear modulus, with shear moduli over 4.0 GPa, and even over 4.5 GPa being obtained.

The invention will be further illustrated with reference to the following examples. They are not to be construed as being limiting in any manner whatsoever.

In these examples, the values for the overall density of the yarns of the rigid rod polymer based on pyridobisimidazole were determined with the aid of a density gradient column. The column was filled with a mixture of degassed ortho-dichlorobenzene having a density of 1305 kg/m³ and tetra-bromo-ethane of a density of 2967 kg/m³, in such a manner that the density gradually increased over the column from 1600 to 1800 kg/m³. The temperature of the column was carefully maintained at 23° C. The samples to be measured were immersed in the mixture after an immersion time of 24 hours the height of the samples was determined. Using a calibration curve obtained by measuring, in the same column, samples of which the density was known exactly, the density of the samples in the gradient column was determined.

The $E_{son}$ values given in the examples is the $E_{son}$ as determined for the internal shear modulus g test, described in Example XIV, extrapolated to zero strain.

EXAMPLE I

Into a 200 ml glass tubular reactor around which a heating jacket was arranged and which was equipped with the necessary connections for letting in $N_2$ and applying a vacuum, and which further contained an anchor-shaped stirrer, were charged 15 g (0.0563 mole) of 2,3,5,6-tetraaminopyridine-trihydrochloride-monohydrate (for which a preparation method is described by Gerber in *J. Pol. Sci. (Pol. Chem.)* 11 (1973), 1703), 11.15 g (0.0563 mole) of 2,5-dihydroxyterephthalic acid (for which a preparation method is described in AT-A-263 754), 10.98 g of $P_2O_5$, and 75.48 g of 84% polyphosphoric acid. In 3 hours the temperature was raised to 105° C., followed by one hour's lowering of the pressure to 40 mbar while maintaining a slight flow of nitrogen above the mixture. Over the next 30 minutes the temperature was raised to 130° C., with all solids going into solution. Over 2½ hours and with stirring, the temperature was further raised to 180° C., with the first phenomena associated with nematic flow behaviour already becoming manifest at 135° C.

After 30 minutes of stirring at a temperature in the range of 180° to 185° C. a portion of the polymer was spun, while another portion coagulated, forming thicker filaments which were pulled from the viscous mixture without the intermediary of a spinning apparatus. After washing with, successively, water, dilute ammonia, and water again, a viscosity of 4.72 was determined (measured on 0.25 g of polymer in 100 ml of methane sulphonic acid at 25° C.).

Example A

Preparation of the phosphate salt of tetraaminopyridine by converting the hydrochloride salt of tetraaminopyridine Under nitrogen, 500.0 g of hydrochloride (1.87 moles) were dissolved completely in 2 liters of oxygen-free water plus 330 g of oxygen-free 85% phosphoric acid (2 moles).

300 ml of 25% ammonia (4 moles) were added to neutralise the HCl present in the tetraaminopyridine crystals; a further addition of 150 ml of ammonia precipitated the tetraaminopyridine phosphate, producing a slurry rather too rich for convenient transfer to a filter. The slurry was filtered with suction, washed thrice with 1 liter of oxygen-free water and twice with 1 liter of oxygen-free ethanol, all under nitrogen. The filter cake was flushed with nitrogen for 2 hours and the product dried for 25 hours at 50° C., 1 mbar, yielding 266.4 g of light yellow tetraaminopyridine phosphate, the yield being 60%.

EXAMPLE II 12.52 grams of the phosphate salt of tetraaminopyridine (the monosalt of 2,3,5,6-tetraaminopyridine) as prepared in example A, 10.46 grams of 2,5-dihydroxyterephthalic acid, 61.37 grams of an 84%-solution of polyphosphoric acid (84% of $P_2O_5$), and 15.66 grams of $P_2O_5$ were added to a 250 ml glas autoclave with an anchor stirrer. The autoclave was evacuated several times and aerated with nitrogen, after which a little nitrogen was added. The obtained slurry was heated with stirring, except where indicated otherwise, by the following schedule:

| heating time [hours] | temperature [°C.] | for period of [hours] |
| --- | --- | --- |
| 0.25 | 75 | 1 |
| 0.25 | 140 | 3 |
| 0.17 | 150 | 3 |
| cooling* | 21 | 15* |
| 0.5 | 160 | 7 |
| cooling* | 21 | 15* |
| 2.0 | 180 | 2 |
| 0.5 | 220 | 2 |

*no stirring

The product was taken from the autoclave, a portion of the polymer was spun, another portion coagulated, forming thicker filaments which were pulled from the viscous mixture without the intermediary of a spinning apparatus. After washing with, successively, water, dilute ammonia, and water again, viscosities of 3.58 and 3.98, respectively, were determined.

EXAMPLE III 12.52 grams of tetraaminopyridine phosphate as prepared in Example A, 10.46 grams of 2,5-dihydroxyterephthalic acid, 61.56 grams of polyphosphoric acid (84% $P_2O_5$), 15.67 grams of $P_2O_5$, and 0.29 grams of tin chloride were added to a glass autoclave and heated, with initially slow, then increasingly rapid stirring, to 100° C. in 0.33 hours, and kept at that temperature with stirring for 1 hour. The slurry was then heated to 140° C. in 0.25 hours and stirred for 0.75 hours at that temperature, after which the temperature was raised to 180°–185° C. in 0.25 hours. The product reached a maximum relative viscosity after about 2.5 hours of stirring at 180° C. The product was released after a total of 4.5 hours of stirring at 180° C. A portion of the polymer was spun, another portion coagulated, forming thicker filaments which were pulled from the viscous mixture without the intermediary of a spinning apparatus. After washing with, successively, water, dilute ammonia, and water again, a viscosity of 14.2 was determined.

Example B

Preparation of tetraaminopyridinium dihydroxy terephthalate

In degassed water under a nitrogen atmosphere, the following solutions were made:

a) 9.91 g of 2,5-dihydroxyterephthalic acid and 6.05 g of NaOH in 140 g of water, by heating with stirring to about 50° C.;

b) 13.33 g of tetraamino pyridine hydrochloride in 95 g of water, at room temperature.

With vigorous stirring and without the introduction of any air b) was added to a), producing a rich yellow precipitate. After further adiabatic stirring for 5 minutes, the slurry was cooled, with stirring, to about 10° C. and filtered, washed three times with about 250 ml of degassed water and twice with degassed ethanol, all this without the introduction of air, flushed with nitrogen for 45 minutes, and dried at 1 mbar, 50° C. for 18 hours to produce 16.56 grams (which corresponds to a yield of 98.2%) salt of tetraaminopyridine and 2,5-dihydroxyterephthalic acid. This salt showed a 1:1 tetraaminopyridine/2,5-dihydroxyterephthalic acid composition in NMR. It was found possible to polymerise it to very high DP polymer under standard conditions. Storing the salt of tetraaminopyridine and 2,5-dihydroxyterephthalic acid samples under air instead of under nitrogen showed only slow deterioration of its colour.

EXAMPLE IV 185.51 grams of the salt obtained from Example B, 1.0 gram of tin powder, 732.41 grams of 84%-polyphosphoric acid, and 124.06 grams of $P_2O_5$ were heated in 0.25 hours to 100° C., with stirring, and kept at 100° C. for 0.75 hours with stirring at an increasing rate. The slurry was further heated to 140° C. in 0.67 hours and kept at that temperature, with stirring, for another 55 minutes. The temperature was further increased to 180° C. in 0.33 hours and the slurry was stirred at that temperature for another 2.25 hours, after which the contents of the autoclave were fed to a storage chamber of a polymer extruder. A little polymer was taken from the autoclave to determine the $\eta_{rel}$, which was found to be 31.6.

EXAMPLE V

In the same way as indicated in Example IV, 13.79 grams of tetraaminopyridinium dihydroxy terephthalate, 3.23 grams of the phosphate salt of tetraaminopyridine, and 2.28 grams of terephthalic acid, 0.13 grams of tin powder, 67.31 grams of 84%-polyphosphoric acid, and 13.49 grams of $P_2O_5$ were heated in 0.25 hours to 100° C., with stirring, and kept at this temperature for 0.9 hours, with stirring. The slurry was further heated to a 140° C. in 0.67 hours and kept at that temperature, with stirring, for another 55 minutes. The temperature was further increased to 180° C. in 0.33 hours and the slurry was stirred at that temperature for another 2.5 hours. The $\eta_{rel}$ of the copolymer comprising 25% terephatalic acid was 6.77.

EXAMPLE VI

Example V was repeated in such a manner that a copolymer comprising 50% terephtalic acid was prepared. The $\eta_{rel}$ of the copolymer prepared was 4.19.

EXAMPLE VII (comparative)

Example V was repeated, except that 4.89 grams of tetraaminopyridinium dihydroxy terephthalate, 10.36 grams of the phosphate salt of tetraaminopyridine, and 7.33 grams of terephtalic acid were used. The $\eta_{rel}$ was determined to be 1.15, and, hence, very unattractive for any purpose.

EXAMPLE VIII (comparative)

Example VII was repeated, but instead of the tetraaminopyridinium dihydroxy terephthalate, the phosphate salt of tetraaminopyridine was used together with terephtalic acid in the amounts required to make the homopolymer of tetraaminopyridine and terephtalic acid. The reaction products obtained were neither liquid crystalline nor homogeneous, comprising a substantial amount of solids, and had an $\eta_{rel}$ of less than 1.1.

EXAMPLE IX

The polymer obtained from Example IV with a polymer concentration of 14 wt. % was fed at a temperature of 195° C. to an 0.6 cc metering pump by means of a 19 mm single screw extruder. The polymer was passed through a 25 μm filter package and subsequently extruded at a throughput of 6.5 cc/min and a temperature of 205° C. through a spinneret containing 40 spinning holes of a diameter of 100 μm.

Fibres were produced by a dry-jet-wet spinning technique, with water being used as the coagulation medium. The air gap length was 20 mm, the draw ratio in the air gap 4.65. The fibres were wound onto a bobbin, and washed with water for 48 hours, neutralised with ammonia, and washed again. These undried fibres were used for further testing as described in Examples XII and XIII.

The maximum draw ratio in the air gap attained was 12.8.

EXAMPLE X

From the polymer obtained in Example IV, fibres were produced as described in Example IX by spinning through a spinneret containing 40 spinning holes of a diameter of 100 μm and an air gap of 20 mm and coagulation in water. In the air gap, no drawing by the use of force from a godet took place. The virtually undrawn fibres were wound on a bobin, were washed in water for over 48 hours, neutralised with diluted aqueous ammonium hydroxide, washed again with water of 60° C., and dried. The $\eta_{rel}$ was determined according to the procedure indicated above and found to be 29.3.

EXAMPLE XI

Filaments were taken from a series of as-spun wet yarns prepared as described in Example IX, except for the draw ratio λ in the air gap, and the properties were measured. The draw ratio in the air gap and the results of the measurements are as indicated below in Table I. The test procedures were carried out on single filaments taken from one yarn, and were carried out on a Zwick draw bench type 1445, with a length between the clamps before elongation of 100 mm and a pretension of 5 mN/tex. The drawing for the tests is carried out at a speed of 10% length increase per minute. In this and further examples, $\sigma_{br}$ is the tensile strength at break, $\epsilon_{br}$ is the elongation at break, $E_i$ is the initial modulus, i.e. the modulus determined at the range of 5–25 cN/tex.

TABLE I

| sample code | λ | Count [dtex] | σ_br [GPa] | ε_br [%] | E_i [GPa] | E_son [GPa] |
| --- | --- | --- | --- | --- | --- | --- |
| A | 4.6 | 6.8 | 2.3 | 2.4 | 134 | 153 |
| B | 11.9 | 2.6 | 1.7 | 1.4 | 151 | |
| C(40) | 11.7 | 2.8 | 2.3 | 2.3 | 143 | 164 |

EXAMPLE XII

The wet as-spun yarns of Example IX were subjected to an aftertreatment at increasing temperatures as indicated in Table II. Thereto, a yarn was placed in a tube oven with the heat being applied over a length of 600 mm. One end of the yarn was fixed, and to the other end a weight of 1.084 kg was applied for at least one minute. Accordingly, heat treated yarns were prepared and the mechanical properties of single filaments—taken from the yarns—gave the test results— measured as indicated in Example XI—listed in Table II. These results are the average for 20 single filaments measured. Where the results are the average for 40 single filaments, this is indicated as ($^{40}$).

TABLE II

| sample code | T_treat [°C.] | Count [dtex] | σ_br [GPa] | ε_br [%] | E_i [GPa] | E_son [GPa] |
| --- | --- | --- | --- | --- | --- | --- |
| A(40) | 20 | 6.9 | 2.3 | 2.9 | 124 | 148 |
| B | 100 | 6.8 | 2.3 | 1.7 | 159 | |
| C | 200 | 6.5 | 2.6 | 1.9 | 175 | |
| D | 300 | 6.1 | 2.6 | 1.5 | 196 | |
| E | 400 | 5.9 | 3.1 | 1.9 | 187 | |
| F | 500 | 6.1 | 2.6 | 1.5 | 186 | |
| G(40) | 600 | 5.8 | 2.7 | 1.6 | 193 | |
| H(40) | 500* | 6.3 | 2.8 | 1.7 | 189 | |

*This sample was drawn by the use of a weight of 1.084 kg for 10 minutes

EXAMPLE XIII

As-spun yarns, washed and neutralised but undried, obtained from Example IX, with a draw ratio of 4.6 in the air gap, were subjected to a heat treatment. Thereto, the wet yarn was wound using a high precision roller set at a velocity of 1.75 meters per minute. A sufficient number of windings was applied, so that no slipping could occur. For the treatment, an oven with an internal length of about 1 meter and a temperature set at 600° C. was applied, with some nitrogen flushing through. The temperatures indicated in Table III are the maximum temperatures measured in the oven at the moment of the treatment. The yarn was drawn in the oven using a second roller which was identical to the first one, the speed of the second roller being set at a velocity which was 2.2% higher than the first one. The test procedures were carried out the same way as described in Example XI.

The average of the count of 40 filaments was 5.6 dtex, the average tensile strength was 2.6 GPa, the elongation at break 1.2%, the initial modulus 222 GPa, and the sonic modulus 254 GPa.

The irregular extrusion due to corrosion phenomena nothwithstanding, the mechanical properties were very high. The results are given below in Table III.

TABLE III

| sample code | Count [dtex] | σ_br [GPa] | ε_br [%] | E_i [GPa] |
| --- | --- | --- | --- | --- |
| A | 5.6 | 2.5 | 1.1 | 238 |
| B | 5.9 | 3.1 | 1.4 | 224 |
| C | 5.1 | 2.9 | 1.3 | 218 |
| D | 5.6 | 3.0 | 1.4 | 218 |
| E | 5.7 | 2.6 | 1.2 | 221 |
| F | 5.4 | 2.5 | 1.1 | 230 |
| G | 5.1 | 2.9 | 1.4 | 211 |
| H | 5.8 | 2.7 | 1.1 | 235 |
| I | 5.3 | 3.4 | 1.6 | 211 |
| J | 5.3 | 2.7 | 1.3 | 237 |
| K | 5.6 | 3.0 | 1.4 | 221 |

EXAMPLE XIV

To demonstrate that the products of the present invention have mechanical properties unique to an organic polymer fibre, fibres prepared according to the method described in Example IX, fibres prepared according to Examples XII and XIII, and prior art fibres were tested using an internal shear modulus test, which involves the measurement of the sonic modulus as a function of the applied tensile strain.

By determination of the internal shear modulus, g, a very good indication can be given of several different characteristics, e.g., the tensile modulus, the torsional modulus, and the axial compressive strength of the fibre are all positively correlated with the internal shear modulus. Thus, the internal shear modulus is a very suitable parameter for comparison of the mechanical properties in general of the present fibres with those of the strong fibres known in the art, such as poly(p-phenylene benzobisoxazole) and poly(p-phenylene terephthalamide).

The value of the internal shear modulus, g, can be determined from plotting the sonic compliance against the chain orientation parameter measured for fibres with different degrees of orientation by X-ray diffraction, or from the curve representing the sonic compliance versus the rotational strain.

The internal shear modulus determining the tensile deformation of a polymer fibre is calculated from the initial slope α of the curve representing the sonic compliance, $S=E_{son}^{-1}$, versus the rotational strain, $\epsilon_{rot}.\epsilon_{rot}$ is defined by $$\epsilon_{rot}=\sigma/E_c$$

with $\epsilon_{rot}$ being the chain modulus and σ the tensile stress. The sonic modulus $E_{son}$ is the value for the modulus calculated from the velocity of sound, v, by the equation:

$$E_{son}=\rho.v^2$$

where ρ is the density of the fibre and v the velocity of sound in the fibre. This velocity is the propagation velocity of a short sonic pulse as measured according to the procedure described in the next section. The equation for the sonic modulus $E_{son}$ of an oriented fibre is given by:

$$\frac{1}{E_{son}} = \frac{1}{E_C} + \frac{<\sin^2\Phi>E}{2g}$$

where g is the internal shear modulus for the tensile deformation, Φ is the orientation angle of the chain axis with respect to the fibre axis and $<\sin^2\Phi>_E$ is the orientation parameter averaged over the orientation distribution f(Φ) of the chain axis with respect to the fibre axis, as defined in *Polymer*, by M. G. Northolt et al., Vol., 26, (1985), page 310. For a well oriented fibre the tensile strain is given by the equation $$\epsilon = \frac{\sigma}{E_C} + \frac{<\cos\Phi> - <\cos\Phi_o>}{<\cos\Phi_o>}$$

The first term in this equation is the contribution owing to the elongation of the chain, while the second term is the rotational strain, and is the contribution due to shear deformation resulting in rotation of the chain axes towards the fibre axis and thus in a contraction of the chain orientation distribution.

Combination of the equation for $\epsilon_{rot}$ and for $\epsilon$ results in the equation for the initial slope $\alpha$, which is thus given by the equation:

$$\alpha = \frac{\Delta S}{\Delta \epsilon_{rot}} = \frac{-1}{C \cdot g}$$

wherein $\Delta S$ is the change of the compliance $1/E_{son}$ in the strain interval described below, and $\Delta \epsilon_{rot}$ is the change in rotational strain over the same strain interval of the curve representing the sonic modulus versus the strain.

The constant C is determined by the shape of the orientation distribution of the chain axis and is defined by $$C = \frac{2}{<\cos\Phi_o>} \cdot \frac{<\cos\Phi> - <\cos\Phi_o>}{<\sin^2\Phi>_E - <\sin^2\Phi>_E}$$

where the averages $<\cos\Phi>$ and $<\sin^2\Phi>_E$ are taken over the strain interval in the sonic modulus versus the strain curve as specified below. For the fibre of the invention the constant C was 1.1.

Using the equation for $\alpha$ given above, the shear modulus, g, is calculated from the initial slope $\alpha$ of the sonic compliance versus the rotational strain curve.

The internal shear modulus can be determined by the use of any suitable manually or automatically driven tensile testing machine equipped with a sonic device for measuring the velocity of sound during the extension of the fibre. The testing machine is equipped with one movable clamp and a load cell. The gauge length of the tested bundle is 1800 mm or more. The tensile testing machine is equipped with an extensometer system as specified in ASTM E83. The fixed and the variable error of the strain must not exceed $2.10^{-3}\%$. The load cell indicates the load with an accuracy of $\pm 1\%$ of the maximum indicated value of the test. The sonic pulse used for the determination of the velocity of sound has a distinct first peak. The rising edge of the first peak has a smooth clock-shape with a rise time shorter than 25 μs. The sonic velocity is determined by measuring the propagation velocity of the rising edge of the first peak at 50% of the maximum height of the peak. The propagation velocity is measured over a distance of more than 1.0 meter. The sonic device measures the velocity of sound with an absolute accuracy of more than 5% and a relative accuracy of more than 1%.

The shape and the width of the orientation distribution $f(\Phi)$ of the chain axes in the fibres tested is measured by making an X-ray diffraction pattern of a small number of fibres aligned parallel to each other using a flat plate camera in accordance with the procedures given in L. E. Alexander, *X-ray Diffraction Methods in Polymer Science*, (Malabar, Fla.: R. E. Krieger Publishing Company, 1985). The azimuthal distribution of the main equatorial reflection in this diffraction pattern with a spacing of about 0.335 nm is considered to represent the orientation distribution of the chain axis.

The linear density of the fibre is measured by weighting a fibre sample of 500 mm length. Thereto, a sample is cut from the fibre which is fixed on a flat surface under a low pre-tension of 5mN/tex, using two markers which are fixed on the yarn with a spacing between them of $500\pm1$ mm. The weight M of the sample is measured by the use of a balance with a precision of more than 1%. The outcome M is expressed in mg. The count of the sample is calculated in dTex by $$\text{count} = 10 \cdot \frac{M}{0.5}$$

The sonic modulus is determined by the following procedure: the conditioned yarn is clamped in the tensile machine equipped with the sonic device. The zero point of strain for the sonic modulus strain test is determined at pre-stress of 5 mN/tex. The strain of the yarn is calculated with respect to the length of the yarn at the specified pre-stress. The strain of the fibre is increased stepwise by steps smaller than $5.10^{-4}$ m/m from 0 to $5.10^{-3}$ m/m strain. At each step, the strain, the stress, and the velocity of sound of the filaments are recorded. The values for the stress and the velocity of sound are determined within 30 seconds from the strain having been increased.

For each point the rotational strain, $\epsilon_{rot}$, is calculated from the stress and the strain, using the formulae given above. The value for $\alpha$ is determined by calculating the most probable regression line from the values of the compliance and the rotational strain by linear regression on the data points in the interval $5.10^{-3}$ to $5.10^{-4}$ for the fibre strain. The correlation coefficient of the regression must be higher than 0.95.

The value of the internal shear modulus, which is calculated by the use of the above formulae, is determined for at least three samples and is considered to be the average value of the internal shear moduli of these three or more samples. Clearly outlying values should not be used for the determination of the average value of the shear modulus.

Test of the fibres

The numbers in parentheses are the estimated standard deviations from the average, using the Students' t-test and a 95% probability interval.

The value for the chain modulus, $E_c$, used in the calculation of the g value from the sonic compliance versus rotational strain curve is 475 GPa for the fibres of the present invention.

Fibres without an aftertreatment

As-spun fibres obtained as described in Example XI A and Example XII A were tested according to the above method. The internal shear modulus values measured was 3.9 (0.4) GPa.

Fibres with an aftertreatment

Samples obtained as described in Example XV D and Example XIII were also tested according to the above method. The internal shear modulus measured was 4.6 (0.6) GPa.

Comparative

Poly(p-phenylene benzobisoxazole) obtainable by the method described in J. F. Wolfe, *Encyclopedia of Polymer Science and Engineering*, 2nd Ed. Vol. 11, p. 601, was spun into fibres by a spinning process similar to that described in Example IX. The temperature of the spinning dope was 155° C., and the fibres were spun through a spinneret having 30 holes with a diameter of 70 μm each. The draw ratio λ was 2.7, the take up speed 2.7 meters per minute. The value for the chain modulus of this material, $E_c$, used in the calculation of the g value from the sonic compliance versus rotational strain curve was taken to be 475 GPa, as indicated in, e.g., *Conf. Proc. of the 7th Intern. Conf. on Deformation, Yield and Fracture of Polymers* at Cambridge (UK)(1988) by W. Adams et al., published by the Plastics and Rubber Institute. The internal shear modulus determined was 0.65 (0.2) GPa.

The same poly(p-phenylene benzobisoxazole) fibres prepared as indicated above were subjected to a heat treatment in the same manner as described in Example XIII. The internal shear modulus determined was 2.9 (0.7) GPa.

For fibres of Twaron®, a poly(p-phenylene terephthalamide) commercially available from Akzo Nobel N. V., Arnhem, the chain modulus $E_c$ was taken to be 220 GPa, as indicated in, e.g., *Advances in Polymer Science*, by M. G. Northolt and D. J. Sikkema, Vol. 98, page 115.

The internal shear modulus of not heat treated polymer was determined to be 1.5 (0.1) GPa. For the heat treated fibres, treated in the same way as described for the fibres of Example XIII, the the g value was determined to be 2.3 (0.3) GPa.

EXAMPLE XV

Two batches of polymer were prepared in the same manner as described in Example IV. The polymer solutions so obtained had a concentration of 14 wt. % and an $\eta_{rel}$ of 17 and 45, respectively. The batches were both fed to an 0.6 cc metering pump by means of a 19 mm single screw extruder at a temperature of 195° C. The polymer was passed through a 25 μm filter package and subsequently extruded at a throughput of 3.1 cc/min and a temperature of 205° C. through a spinneret containing 40 spinning holes of a diameter of 75 μm. Fibres were produced by means of the dry-jet-wet spinning technique, and water was used as the coagulation medium. The air gap length was 30 mm, and the fibres were wound, undried, onto a bobbin. Then, the fibres were washed for 48 hours, neutralised with ammonia, and washed again. The draw ratio obtained in the air-gap was 4.2.

The wet as-spun yarns of Example IX were subjected to drawing at a temperature of 580° C. in the same manner as described in Example XIII. The yarn was drawn in the oven using a second roller which was identical to the first one, the speed of the second roller being set at a velocity which was 0, 0.5, 1.0, 1.5, 2.0, and 2.2 % respectively higher than the first one.

The sonic modulus of this series was determined by the procedure indicated above. The results are given in Table IV.

TABLE IV

| sample code | elongation after heat treatment [%] | $E_{son}$ [GPa] |
| --- | --- | --- |
| A | 0.0 | 181 |
| B | 0.5 | 213 |
| C | 1.0 | 241 |
| D | 1.5 | 226 |
| E | 2.0 | 246 |
| F | 2.2 | 240 |

We claim:

1. A rigid rod polymer in which at least 50% of the recurring groups correspond to the formula:

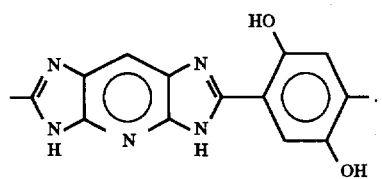

2. The rigid rod polymer according to claim 1, wherein at least 50% of the recurring groups are composed of pyridobisimidazole-2,6-diyl(2,5-dihydroxy-p-phenylene), and in the remaining groups (a) the 2,5-dihydroxy-p-phenylene is replaced by an arylene which may be substituted or not, (b) the pyridobisimidazole is replaced by at least one of benzobisimidazole, benzobisthiazole, benzobisoxazole, pyridobisthiazole, and pyridobisoxazole, or (c) both.

3. The rigid rod polymer according to claim 1, wherein at least 75% of the recurring groups are composed of pyridobisimidazole-2,6-diyl (2,5-dihydroxy-p-phenylene), and in the remaining groups (a) the 2,5-dihydroxy-p-phenylene is replaced by an arylene which may be substituted or not, (b) the pyridobisimidazole is replaced by at least one of benzobisimidazole, benzobisthiazole, benzobisoxazole, pyridobisthiazole, and pyridobisoxazole, or (c) both.

4. The rigid rod polymer according to claim 1, wherein at least 90% of the recurring groups are composed of pyridobisimidazole-2,6-diyl(2,5-dihydroxy-p-phenylene), and in the remaining groups (a) the 2,5-dihydroxy-p-phenylene is replaced by an arylene which my be substituted or not, (b) the pyridobisimidazole is replaced by at least one of benzobisimidazole, benzobisthiazole, benzobisoxazole, pyridobisthiazole, and pyridobisoxazole, or (c) both.

5. The rigid rod polymer according to claim 3, wherein the arylene which may be substituted or not represents a divalent radical left after removal of the carboxyl groups of an arylene dicarboxylic acid.

6. The rigid rod polymer according to claim 1, wherein each of the recurring groups is composed of pyridobisimidazole-2,6-diyl (2,5-dihydroxy-p-phenylene).

7. The rigid rod polymer according to claim 1, wherein the polymer has an $\eta_{rel}>3.5$ (0.25 g/dl in methane sulfonic acid at 25° C.).

8. A polymer composition which because of its viscosity is suitable for being extruded into fibres and films, which composition comprises a solution of a rod polymer according to claim 1 in polyphosphoric acid, with the concentration of $P_2O_5$ in the $P_2O_5/H_2O$ solvent system being at least 79.5 wt. % and not more than 84 wt. %.

9. The polymer composition according to claim 8, wherein the concentration of the rod polymer is in the range of from 10 to 21 wt. %.

10. A process for the preparation of a rod polymer according to claim 1, wherein the polymer is prepared from the phosphate salt of tetraaminopyridine and 2,5-dihydroxyterephthalic acid in a strong polyphosphoric acid solution.

11. A process for the preparation of a rod polymer according to claim 1, wherein the polymer is prepared by the polymerisation of tetraaminopyridinium dihydroxy terephthalate.

12. A process for fabricating shaped products, films, filaments, and yarns, in which process a polymer composition according to claim 8 is extruded and spun, respectively.

13. A process according to claim 12, wherein the extruded product is treated under tension at a temperature higher than 200° C.

14. A composition with at least one small dimension wherein the composition comprises a rod polymer according to claim 1.

15. The composition according to claim 14, wherein the composition consists of a rod polymer according to claim 1.

16. The composition according to claim 14, wherein the composition is prepared by a process in which the polymer composition is extruded and spun, respectively, and has an internal shear modulus equal to or higher than 2.0 when measured directly after the fibres have been obtained.

17. The composition according to claim 14, wherein the composition is prepared according to a process in which the polymer composition is extruded and spun, respectively, and has an internal shear modulus higher than 3.0.

18. The composition according to claim 17, wherein the composition is has an internal shear modulus higher than 4.0.

19. A rigid rod polymer according to claim 5, wherein said arylene dicarboxylic acid comprises isophthalic acid, terephthalic acid, 2,5-pyridine dicarboxylic acid, 2,6-naphthalene dicarboxylic acid, 4,4'-diphenyl dicarboxylic acid, 2,6-quinoline dicarboxylic acid, and 2,6-bis(4-carboxyphenyl) pyridobisimidazole.

* * * * *

UNITED STATES PATENT AND TRADEMARK OFFICE
CERTIFICATE OF CORRECTION

PATENT NO. : 5,674,969
DATED : October 7, 1997
INVENTOR(S) : Doetze Jakob Sikkema, Vadim Leonidovich Lishinsky It is certified that error appears in the above-indentified patent and that said Letters Patent is hereby corrected as shown below:

Front Page, Inventors Section, change "Russian Federation" to --West Virginia--;
Col. 4, line 11, change " Brittish" to --British--;
Col. 7, line 61, change "terephatalic" to --terephthalic--
Col. 10, line 47, change "$\varepsilon_{rot} = \sigma/E_c$" to --$\varepsilon_{rot} = \sigma/E_c$--;
Col. 10, line 60, change the numerator designation "$<\sin^2\phi>E$" to read --$<\sin^2\phi>_E$--;
Col. 11, line 30, change "$<\sin^2\phi>E$" to --$<\sin^2\phi>_E$--;
Col 11, line 55, change "more" (both occurrences) to --better--;
Col. 12, line 7, change "more" to "better--; and
Col. 15, line 9, Col. 16, line 2 and Col. 16, line 5, insert --GPa-- after "2.0", "3.0", and "4.0", respectively.

Signed and Sealed this

Second Day of June, 1998

BRUCE LEHMAN

*Attest:*

*Attesting Officer*           Commissioner of Patents and Trademarks